United States Patent
Wang et al.

(10) Patent No.: US 9,625,634 B2
(45) Date of Patent: Apr. 18, 2017

(54) LIGHT CONDUCTING DEVICE, BACKLIGHT MODULE AND DISPLAY DEVICE

(71) Applicant: BOE TECHNOLOGY GROUP CO., LTD., Beijing (CN)

(72) Inventors: Shang Wang, Beijing (CN); Qiuxiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 52 days.

(21) Appl. No.: 14/501,202

(22) Filed: Sep. 30, 2014

(65) Prior Publication Data
US 2015/0346412 A1 Dec. 3, 2015

(30) Foreign Application Priority Data
May 30, 2014 (CN) .......................... 2014 1 0240362

(51) Int. Cl.
F21V 8/00 (2006.01)

(52) U.S. Cl.
CPC .......... *G02B 6/0016* (2013.01); *G02B 6/0018* (2013.01); *G02B 6/0021* (2013.01); *G02B 6/0048* (2013.01); *G02B 6/003* (2013.01); *G02B 6/0038* (2013.01); *G02B 6/0053* (2013.01); *G02B 6/0068* (2013.01)

(58) Field of Classification Search
CPC ........................... G02B 6/0021; G02B 6/0016
See application file for complete search history.

(56) References Cited

U.S. PATENT DOCUMENTS

| | | | |
|---|---|---|---|
| 5,477,239 A | 12/1995 | Busch et al. | |
| 6,097,549 A * | 8/2000 | Jenkins | B60Q 1/302 359/726 |
| 2008/0123350 A1 | 5/2008 | Choe et al. | |
| 2008/0158881 A1* | 7/2008 | Liu | F21V 7/0091 362/245 |
| 2009/0167651 A1* | 7/2009 | Minano | G02B 6/0028 345/84 |

FOREIGN PATENT DOCUMENTS

| | | |
|---|---|---|
| CN | 101300451 A | 11/2008 |
| CN | 101839419 A | 9/2010 |
| CN | 103376498 A | 10/2013 |

OTHER PUBLICATIONS

Chinese Office Action dated Mar. 2, 2015 regarding application No. 2014102403628. Translation provided by Dragon Intellectual Property Law Firm.
Chinese Office Action dated Jun. 10, 2015 regarding application No. 2014102403628. Translation provided by Dragon Intellectual Property Law Firm.

\* cited by examiner

*Primary Examiner* — Anh Mai
*Assistant Examiner* — Zachary J Snyder
(74) *Attorney, Agent, or Firm* — Harness, Dickey & Pierce, P.L.C.

(57) ABSTRACT

The present disclosure provides a light conducting device, a backlight module and a display device. The light conducting device cooperates with a light source to form a backlight module. The light conducting device includes at least one light receiving surface. The light receiving surface includes a plurality of annular sub-receiving surfaces configured to cause received light from the light source to be emitted in a single direction.

12 Claims, 5 Drawing Sheets

LIGHT CONDUCTING DEVICE, BACKLIGHT MODULE AND DISPLAY DEVICE

CROSS-REFERENCE TO RELATED APPLICATION

This application claims priority to Chinese Patent Application No. 201410240362.8 filed on May 30, 2014, the disclosures of which are incorporated in their entirety by reference herein.

TECHNICAL FIELD

The present disclosure relates to the field of display technology, and more particularly to a light conducting device, a backlight module and a display device.

BACKGROUND

Liquid crystal display (LCD) has been widely used in various electronic products. Most of the LCDs are backlight type LCDs. The backlight type LCD includes a liquid crystal panel and a backlight module. The backlight module may be divided into two types including a side light type backlight module and a direct light type backlight module, according to different positions where light enters.

To improve a brightness of the backlight module, a prism-type light guide plate has occurred currently. Since there exists a scattering phenomena in the prism-type light guide plate, an angle of view of light entering the panel is caused to be large, thereby affecting the display effect.

SUMMARY

In order to solve the problem that the existing light guide plate cannot provide light emitted with a narrow angle of view, the present disclosure provides a light conducting device, a backlight module and a display device.

The Technical solution of the present disclosure is as follows.

A light conducting device includes:

at least one light receiving surface; wherein the at least one light receiving surface includes a plurality of annular sub-receiving surfaces configured to cause received light from the light source to be emitted in a single direction.

The present disclosure also provides a backlight module, including the light conducting device as described above.

The present disclosure also provides a display device, including the backlight module as described above.

The benefit effects of the present disclosure are as follows. The light receiving surface of one embodiment includes a plurality of annular sub-receiving surfaces which is configured to causing received light from a light source to be emitted in a single direction, thereby achieving a direct light type backlight source with a narrow angle of view.

DETAILED DESCRIPTION

In order to make the above objects, features and advantages of the embodiments of the present disclosure more clear, the technical solutions according to the embodiments of the present disclosure will be clearly and fully described hereinafter in conjunction with the accompanying drawings in the embodiments of the present disclosure.

Figure 1:
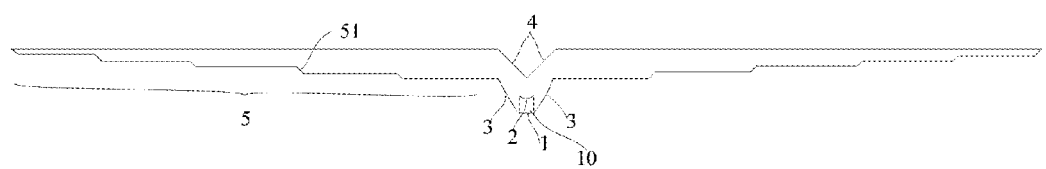
FIG. 1 is a schematic view showing a structure of a light conducting device according to a first embodiment of the present disclosure.
Figure 2:
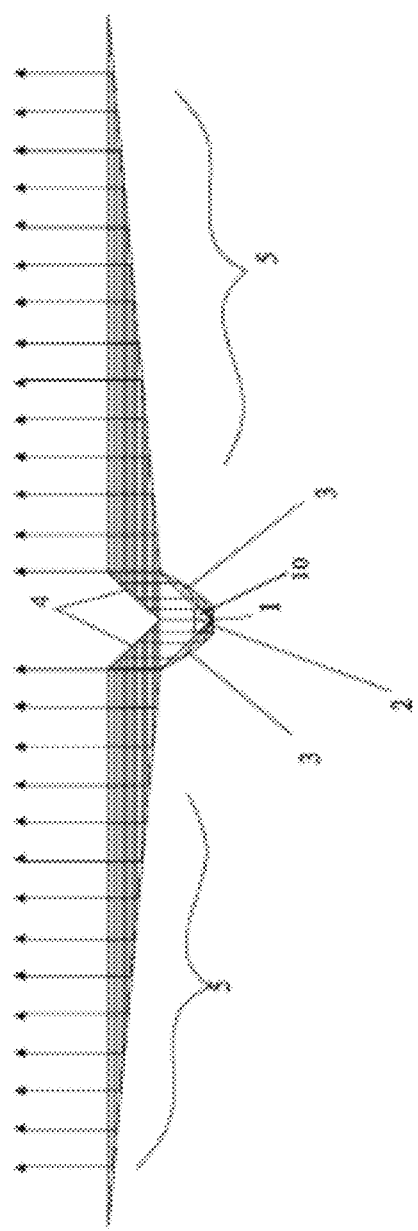
FIG. 2 is a schematic view showing optical paths of the light conducting device in FIG. 1.

FIG. 1 is a schematic view showing a structure of a light conducting device according to a first embodiment of the present disclosure. FIG. 2 is a schematic view showing optical paths of the light conducting device in FIG. 1. As shown in FIGS. 1 and 2, the light conducting device cooperates with a light source 1 to form a backlight module. The light conducting device includes at least one light receiving surface 5. The light receiving surface 5 includes a plurality of sub-receiving surfaces 51 configured to cause received light emitted from the light source 1 to be emitted in a first direction.

The light conducting device further includes an accommodation space 10 for accommodating the light source 1. The accommodation space 10 is formed on the light receiving surface 5. The accommodation space 10 is surrounded by the light receiving surface 5 and the sub-receiving surfaces 51 of the receiving surface 5.

The light receiving surface 5 of this embodiment includes a plurality of annular sub-receiving surfaces 51. Each of the sub-receiving surfaces 51 may be an inclined torus surface, and has an angle of 45 degrees with respect to a first direction. A ladder-type structure is formed between adjacent sub-receiving surfaces 51. A height of each of sub-receiving surfaces 51 is increased in the first direction along an outward direction from the accommodation space 10, for example, a horizontal direction when the light conducting device is in a position shown in FIG. 1. In one embodiment, each of the sub-receiving surfaces 51 is an inclined surface disposed around the accommodation space 10 and the light source 1. For example, the inclined surface may has a shape of a lateral surface of a frustum of a cone; a ladder-type structure is formed between two adjacent sub-receiving surfaces 51.

The light source 1 is disposed in the accommodation space 10. The light conducting device further includes a collimation module such as an inner free-form surface 2 disposed above the light source 1. The collimation module such as the inner free-form surface 2 is configured to cause light which is emitted by the light source 1 and reaches the inner free-form surface 2 to travel in the first direction. The light conducting device further includes a first reflecting surface 3 and a second reflecting surface 4. The first reflecting surface 3 is provided on a sidewall of the accommodation space 10, and is configured to cause light which is emitted by the light source 1 and reaches the sidewall of the accommodation space 10 to travel in the first direction. The second reflecting surface 4 is disposed above the accommodation space 10, and is configured to reflect received light, which has passed though the inner free-form surface 2 and the first reflecting surface 3, to the various sub-receiving surfaces 51 in a second direction perpendicular to the first direction.

In one embodiment, the first direction in which light exits from the light conducting device is a vertically upward direction. Of course, the first direction is not limited to the vertically upward direction, and the vertically upward direction is taken as an example for illustration. The inner free-form surface 2 is positioned right above the light source 1 and faces the light source 1. The inner free-form surface 2 collimates light emitted in a small angle from the light source 1 into a parallel light in an emitting direction. The first reflecting surface 3 totally reflects light emitted in a large angle from the light source 1 to the vertically upward direction, thereby form a vertically upright parallel light. The second reflecting surface 4 reflects received light towards the various sub-receiving surfaces 51 in the horizontally direction. In one embodiment, the second reflecting surface 4 may also allow transmission of light, that is, the second reflecting surface 4 may be a transmission-reflection surface. In one embodiment, the second reflecting surface 4 reflects more than 90% of the light and allows transmission of less than 10% of the light. Such a proportion may allow an effective redistribution of light energy, so as to make the light conducting device have a larger light emitting area and emit more uniform light. In one embodiment, the light received and then reflected by the second reflecting surface 4 is fallen within a receiving range of each of the sub-receiving surfaces 51, which may avoid scattering problems caused by the direct emission of light. The heights of the sub-receiving surfaces 51 in the first direction are gradually increased along a direction outward from the accommodation space 10. The height of the sub-receiving surface 51 which is farthest away from the accommodation space 10 in the first direction is higher than the maximum height of the second reflecting surfaces 4 in the first direction.

FIG. 2 is a schematic view showing optical paths of the light conducting device in FIG. 1. As shown in FIG. 2, in one embodiment, the second reflecting surface 4 disposed above the accommodation space 10 defines an angle of 45 degrees with respect to the horizontal direction. The second reflecting surface 4 is configured to reflect the received light, which passed though the inner free-form surface 2 and the first reflecting surface 3, to the various sub-receiving surfaces 51 in the horizontal direction. Each of the sub-receiving surfaces 51 defines an angle of 45 degrees with respect to the first direction. Each of the sub-receiving surfaces 51 defines an angle of 45 degrees with respect to the horizontal direction and is configured to emit the received horizontal light in a vertical direction. The light emitted from the sub-receiving surface 51 is in a single vertical direction.

In one embodiment, the light receiving surface 5 has a plurality of sub-receiving surfaces 51 surrounding the light source 1, and emits received light which is emitted by the light source 1, in a single direction, thereby forming a direct light type backlight source with a narrow angle of view.

Figure 3:
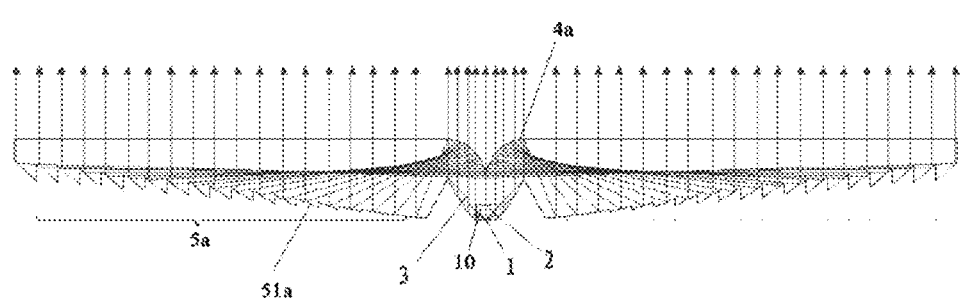
FIG. 3 is a schematic view showing a structure of a light conducting device according to a second embodiment of the present disclosure.
Figure 4:
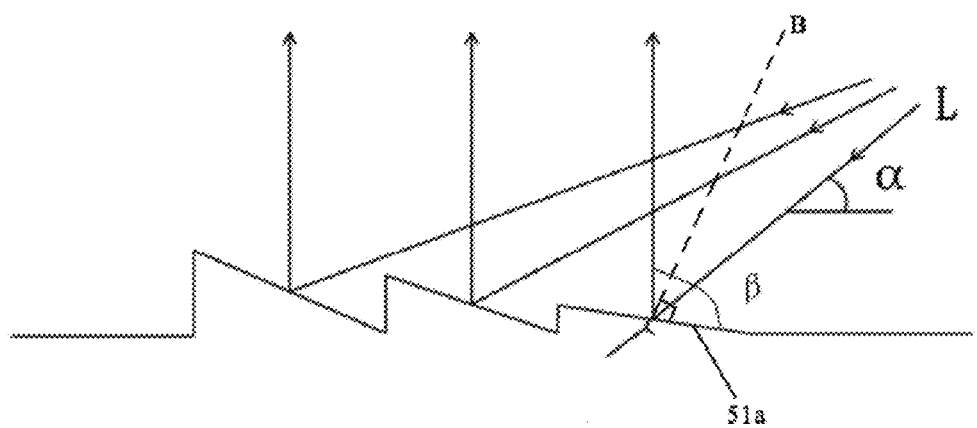
FIG. 4 is a schematic view showing optical paths of a part of the light conducting device in FIG. 3.

FIGS. 3 and 4 are schematic views showing a structure of a light conducting device according to a second embodiment of the present disclosure. As shown in FIGS. 3 and 4, the second embodiment is substantially the same as the first embodiment except that, in the second embodiment, an angle defined between each sub-receiving surface 51a and the first direction is gradually increased in an outward direction from the accommodation space 10, and a corresponding second reflecting surface 4a is a curved surface.

The second reflecting surface 4a emits received light, which has passed though the inner free-form surface 2 and the first reflecting surface 3, to the various sub-receiving surfaces 51, to make an angular bisector be between light incident on each of sub-receiving surfaces 51a and the first direction perpendicular to the corresponding sub-receiving surface 51a, so that the light reaching each of sub-receiving surfaces 51a is emitted from the light conducting device in a single direction.

In one embodiment, the vertically upward direction is taken as an example of the first direction in which light exits from the light conducting device for illustration. As shown in FIG. 4, assuming that an incident light L reflected by the second reflecting surface 4a to one sub-receiving surface 51a defines an angle $\alpha$ with respect to the horizontal direction, and the first direction is a vertically upward direction, since an angular bisector (shown by a dashed line B in FIG. 4) between the incident light L and an outgoing light in the first direction is perpendicular to the first sub-receiving surface 51a, an angle $\beta$ between the sub-receiving surface 51a and the first direction is (135-$\alpha$/2) degrees. The light receiving surface 5a of the present embodiment is composed of a plurality of inner surfaces of a ladder-type lens, i.e., sub-receiving surfaces 51a. Tilt angles of the inner surfaces of the ladder-type lens, i.e., sub-receiving surfaces 51a, are tilt angles which are gradually changed. The tilt angles of inner surfaces, i.e., sub-receiving surfaces 51a, are gradually increased from a position close to the center of the light source 1 to a position away from the center of the light source 1.

Figure 5:
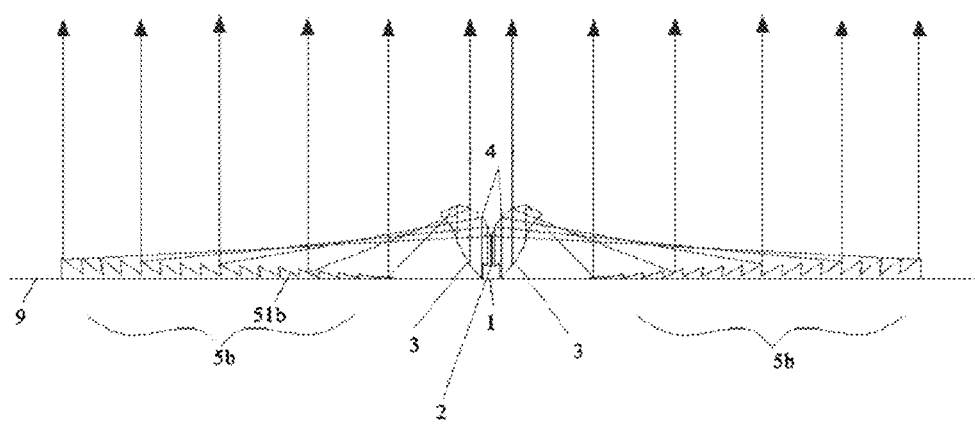
FIG. 5 is a schematic view showing a structure of a light conducting device according to a third embodiment of the present disclosure.
Figure 6:
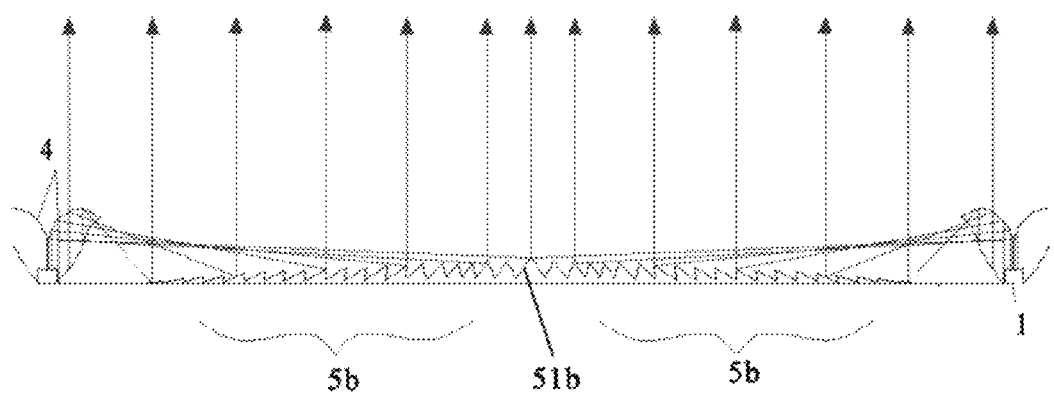
FIG. 6 is a schematic view showing a combination of two light receiving surfaces in FIG. 5.

FIGS. 5 and 6 are schematic views showing a structure of a light conducting device according to a third embodiment of the present disclosure. This embodiment is substantially the same as the second embodiment, and the difference is that each of sub-receiving surfaces 51b in the third embodiment is disposed on a backlight reflecting surface 9. With this structure, the size of the light conducting device may be reduced, thereby achieving a wider range of uniform illumination with a narrow angle of view. In this embodiment, the light source 1 and the backlight reflecting surface 9 are in the same plane. A ladder-type structure is formed on the backlight reflecting surface 9 by the sub-receiving surfaces 51b.

As shown in FIG. 6, a cross section of one sub-receiving surface 51b at a connection position between adjacent receiving surfaces 5b is an isosceles triangle, which collimates distal-end light emitted by the light source 1. With this structure, the extra light emitted by adjacent light sources 1 may be also reflected to the first direction, thereby achieving a collimated illumination at neighboring regions of two adjacent light sources 1. In one embodiment, the tilt angles of the sub-receiving surface 51b between two adjacent light sources 1 are firstly increased and then decreased along a direction from one of the two adjacent light sources 1 to the other.

Figure 7:
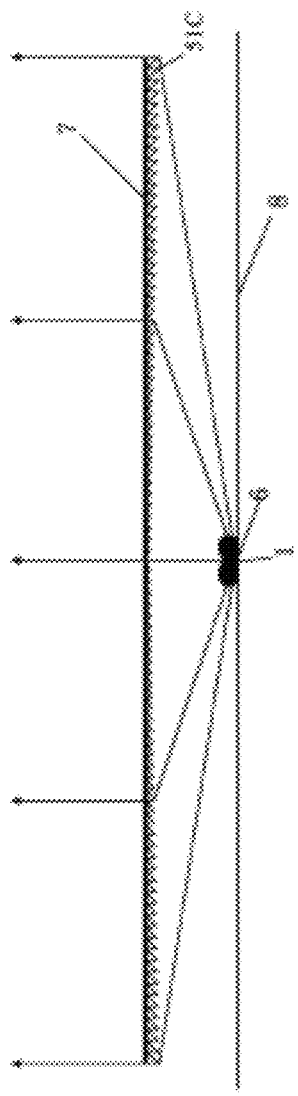
FIG. 7 is a schematic view showing a structure of a light conducting device according to a fourth embodiment of the present disclosure.

FIG. 7 is a schematic view showing a structure of a light conducting device according to a fourth embodiment of the present disclosure. This embodiment is substantially the same as the first embodiment, and the difference is that sub-receiving surfaces 51c of the fourth embodiment are prism surfaces and the sub-receiving surfaces 51c are configured to refract received light from the light source 1 in a vertical direction. The light source 1 is provided on a bottom reflecting layer 8. The sub-receiving surfaces 51c such as prism surfaces, are provided on a support layer 7. A light homogenizing lens 6 is disposed between the light source 1 and the sub-receiving surfaces 51c such as prism surfaces.

The light source 1 is located in the light homogenizing lens 6. Lambertian light emitted by the light source 1 enters into the light homogenizing lens 6 and uniformly emits from the light homogenizing lens 6 upwardly. The light homogenizing lens 6 achieves the purposes of homogenizing the light.

One embodiment of the present disclosure also discloses a backlight module, including the above-described light conducting device.

The present disclosure also discloses a display device adopting any of the backlight modules according to the above-described embodiments. The display device may be an LCD panel, an e-paper, an OLED panel, a mobile phone, a tablet computer, a television, a monitor, a notebook computer, a digital photo frames, a navigator, or any other components or products having a display function.

The above are exemplary embodiments of the present disclosure. It should be noted that a number of improvements and modifications may be made for those of ordinary skill in the art without departing from the principles of the present disclosure, and should be considered as falling within the scope of the disclosure.

What is claimed is:

1. A light conducting device, comprising:
  at least one light receiving surface, wherein the light receiving surface comprises a plurality of annular sub-receiving surfaces configured to receive light from a light source and emit the light in a single direction;
  wherein the light receiving surface is provided with an accommodation space with the light source being received therein, each of the sub-receiving surfaces surround the accommodation space, and each of the sub-receiving surfaces are configured to reflect the light received from the light source and emit the light in the single direction;
  each of the sub-receiving surfaces includes an inclined surface, and angles between the sub-receiving surfaces and the single direction are increased in an outward direction from the accommodation space;
  the light conducting device further comprises a first reflecting surface and a second reflecting surface;
  the first reflecting surface is provided on the accommodation space, the second reflecting surface is disposed above the accommodation space, and the first reflecting surface and the second reflecting surface are disposed oppositely and spaced from each other;
  the first reflecting surface is configured to receive light from the light source and cause the light received from the light source to travel in the single direction towards the second reflecting surface;
  the second reflecting surface is configured to reflect light transmitted from the first reflecting surface to the light receiving surface; and
  wherein each portion of the second reflecting surface is a transmission-reflection surface.

2. The light conducting device according to claim 1, further comprising a light collimation module disposed above the light source, wherein the collimation module is configured to receive light from the light source and cause the light received from the light source to travel in the single direction.

3. The light conducting device according to claim 2, wherein the collimation module comprises an inner free-form surface disposed above the light source and in the accommodation space.

4. The light conducting device according to claim 1, wherein the second reflecting surface is further configured to reflect the light transmitted from the first reflecting surface to the light receiving surface in a direction perpendicular to the single direction.

5. The light conducting device according to claim 1, wherein the inclined surface of each of the sub-receiving surfaces has a shape of a lateral side of a frustum of a cone, and a ladder-type structure is formed between two adjacent sub-receiving surfaces.

6. A backlight module comprising the light conducting device according to claim 1.

7. The backlight module according to claim 6, further comprising a plurality of light sources,
  wherein the light conducting device comprises a plurality of light receiving surfaces;
  the plurality of light receiving surfaces correspond to the plurality of light sources in a one to one manner; and
  the plurality of sub-receiving surfaces of each of the light receiving surfaces surround the corresponding light source.

8. The backlight module according to claim 7, wherein tilt angles of the sub-receiving surfaces between two adjacent light sources are firstly increased and then decreased along a direction from one of two adjacent light sources to the other.

9. The backlight module according to claim 7, wherein a cross section of a sub-receiving surface at a connection position between adjacent receiving surfaces located between two adjacent light sources is an isosceles triangle.

10. A display device comprising a backlight module according to claim 6.

11. The light conducting device according to claim 1, wherein the angles between the sub-receiving surfaces and the single direction are increased in the outward direction from the accommodation space such that each of the angles are different.

12. The light conducting device according to claim 1, wherein the second reflecting surface reflects more than 90% of light reaching the second reflecting surface and allows transmission of less than 10% of the light reaching the second reflecting surface.

\* \* \* \* \*